July 16, 1935.   W. R. GRISWOLD   2,008,497

SYNCHRONIZING MECHANISM FOR TRANSMISSION GEARING

Filed May 2, 1932

Inventor
WALTER R. GRISWOLD.
By
Attorney

Patented July 16, 1935

2,008,497

UNITED STATES PATENT OFFICE 2,008,497

SYNCHRONIZING MECHANISM FOR TRANSMISSION GEARING

Walter R. Griswold, Detroit, Mich., assignor to Packard Motor Car Company, Detroit, Mich., a corporation of Michigan Application May 2, 1932, Serial No. 608,663

3 Claims. (Cl. 192—53)

This invention relates to motor vehicles and particularly to the transmission gearing thereof. It is more especially concerned with that type of gearing having synchronizing mechanism wherein the relatively sliding elements are by friction devices brought to a substantially uniform speed before meshing.

Such a synchronizing mechanism usually employs a dash pot device for the purpose of retarding the shifting action sufficiently to give the rotating parts time to synchronize. Usually the dash pot is of the piston and cylinder type containing a liquid such as oil, which liquid is forced through a valved port or a passage of predetermined size in causing the delayed action.

One of the objects of the present invention is to provide such a synchronizing mechanism with a supply of oil or other liquid for the dash pot device.

Another object of the invention is to provide such a synchronizing mechanism with suitable means for assuring escape of air from the dash pot cylinder while at the same time keeping the dash pot suitably supplied with oil or other liquid.

Other objects of the invention will appear from the following description taken in connection with the drawing, which forms a part of this specification, and in which.

Figure 1:
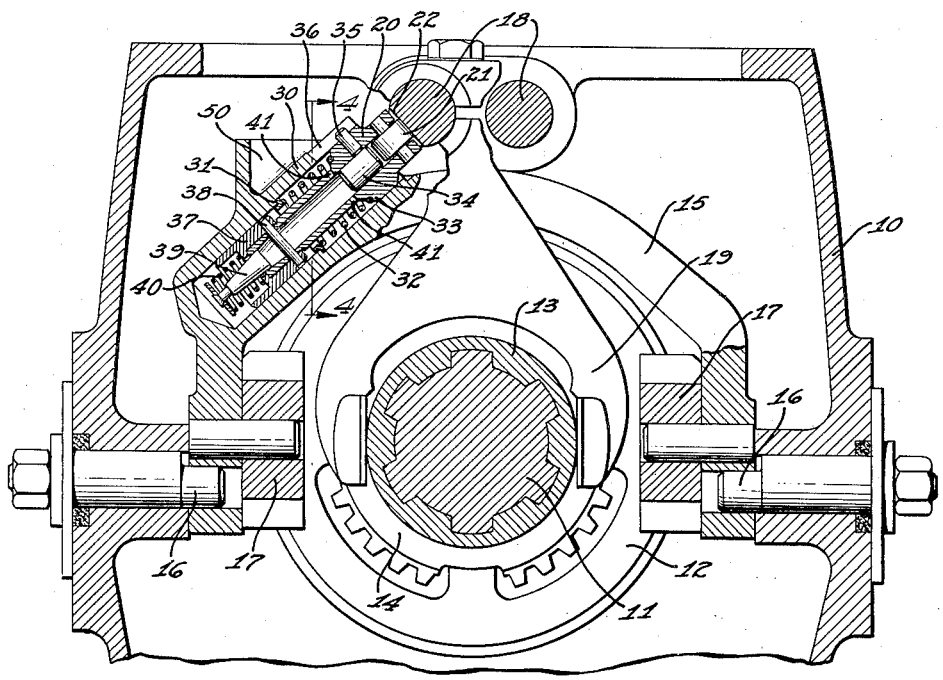
Fig. 1 is a vertical transverse section through a transmission gearing embodying the invention.
Figure 2:
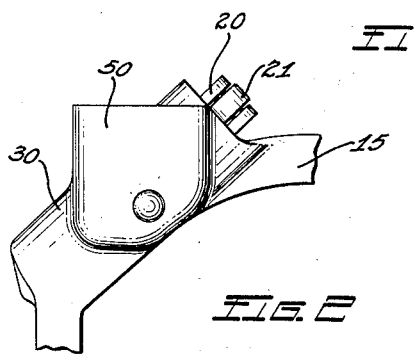
Fig. 2 is a detail view of a portion of the synchronizing mechanism showing the liquid reservoir in elevation.

Referring to the drawing, 10 represents a transmission gear case in which the transmission gears are suitably mounted. One of the transmission shafts is shown at 11 and upon this is mounted one of the gear elements 12. A sleeve 13, splined on the shaft 11, carries an element 14 which may be one of the relatively sliding elements for effecting a coupling of the gear parts.

15 is a shiftable synchronizing member shown in the form of a yoke and pivoted upon eccentrically mounted pivots 16 in the side walls of the gear casing 10. The eccentric mounting of these pivots makes the yoke 15 adjustable to take up wear or for initial adjustment at the factory.

Pivoted on the yoke in offset relation to the pivots 16 are thrust blocks 17 which co-operate with the shiftable elements in any suitable way to effect their operation.

Above the yoke 15 are shifter rods 18, one of which is adapted to slide the sleeve 13 through an arm 19 and the other of which is adapted to operate similar elements of the gearing which are not shown in the drawing. One of the rods 18 also operates the yoke 15 for the purpose of shifting the synchronizing mechanism and the connection between the yoke and the rod 18 is through a plunger 20 mounted in the yoke. This plunger 20 has a roller 21 mounted in its upper end and this roller rests in a notch 22 in the rod 18. It will be obvious that shifting the rod 18 lengthwise will cause a rocking action of the yoke 15 on its pivots 16 as long as the roller 21 remains in the notch 22. At the same time, the endwise movement of the rod 18 will carry the arm 19 along with it and thereby shift the element 14. By suitably relating the leverages the synchronizing element is first engaged and the clutch element is meshed after the parts have become synchronized. The time element for this synchronizing is governed by a dash pot to which the plunger 20 is connected as will be hereinafter described.

The dash pot device referred to is shown as mounted on the yoke 15 and it is in the form of a cylinder 30 arranged diagonally on one side of the yoke. The outer half of this cylinder 30 is bored a little larger than the inner half and the plunger 20 extends through the outer half of the cylinder and into the inner half. A shoulder is formed at 31 and a spring 32 extends from that shoulder to the enlarged part 33 of the plunger 20, thereby constantly pressing the plunger outwardly or into contact with the notch 22 of the shifter rod 18. The plunger 20 is shown as being hollow but its upper end is closed by a suitable plug 34, and a pin 35 extends outwardly from the plunger and rides in a longitudinal slot 36 in the upper end of the cylinder 30. This slot 36 also forms an air outlet at the upper end of the cylinder so that any air in the dash pot device may escape at that point.

The lower end of the plunger has a piston 37 connected to it by a pin 38 and the piston rides in the lower part of the cylinder and, in connection with the closed end of the cylinder, forms a dash pot. The pressure below the piston may be relieved by a conical valve 39 held to its seat by a spring 40. This will open the under side of the piston to the interior of the plunger 20 and the oil or air may escape therefrom through one or more openings 41 just beneath the plug 34.

Figure 4:
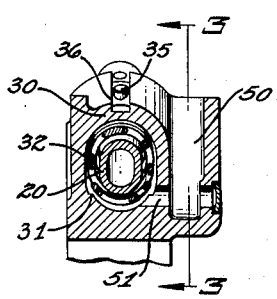
Fig. 4 is a vertical section substantially on the line 4—4 of Fig. 1.
Figure 3:
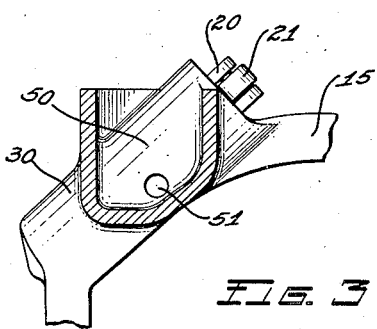
Fig. 3 is a view similar to Fig. 2 except that the reservoir is sectioned on the line 3—3 of Fig. 4.

Formed as an integral part of and shown as partially surrounding the cylinder 30 is a reservoir 50. The lower part of this reservoir communicates with the interior of the cylinder at a point above the piston travel but appreciably below the air outlet 36. This communication is through a conduit 51 shown particularly in Figs. 3 and 4. It enters the cylinder 30 approximately at the shoulder 31.

In a dash pot such as this it is particularly desirable that there shall be no air in the system or if air succeeds in getting in, that it shall be quickly expelled. Otherwise the dash pot action is interfered with due to the compressibility of the air. In the present construction the air is permitted to escape at the top of the cylinder and the oil is supplied to the cylinder near the bottom of the low pressure part thereof. It will be understood that there is sufficient clearance between the piston 37 and the part of the cylinder in which it operates to permit the oil to work down past the piston when the spring 32 pushes the plunger outwardly into the notch 22. In this way the operation of the device causes the oil to be pushed slowly out from under the piston thereby retarding the action of the shifter rod 18, and then as the rod 18 reaches a position where the plunger 20 will enter the same or another notch the oil will be drawn back under the piston again. Any air in the system escapes through the air outlet 36 and overflow oil also escapes into that point and into the reservoir 50. The supply of oil to the cylinder is replenished from the reservoir 50 through the conduit 51 which communicates with a low point in the low pressure part of the cylinder. Thus there is a constant tendency to expel the air from the system and to keep it constantly replenished with oil for its most satisfactory operation.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a transmission gearing including a shiftable member, a dash pot device mounted on said member and having an open air outlet at its upper end, and a reservoir for operating liquid mounted on said member and connected by a conduit with said device below said air outlet, said reservoir being open at its upper end.

2. In a motor vehicle, the combination of a transmission gearing including a shiftable member, a dash pot device including a cylinder on said member and a piston operating in the lower part of the cylinder, there being an open air outlet at the upper end of the cylinder, and a reservoir on said member adjacent said cylinder and having a conduit extending from the lower part of the reservoir to the interior of the cylinder above the path of travel of the piston but below the said air outlet, for supplying liquid to the dash pot device.

3. In a motor vehicle, the combination of a transmission gearing including a shiftable member, a dash pot device mounted on said member and having an open air outlet at its upper end and having a piston member, and a reservoir for operating liquid mounted on said member and connected by a conduit with said device above the travel of the piston member and below said air outlet.

WALTER R. GRISWOLD.